United States Patent
Odic

(10) Patent No.: US 6,231,395 B1
(45) Date of Patent: May 15, 2001

(54) CARD READER CONNECTOR, WITH ELASTIC BRUSH CONTACTS, AND READER COMPRISING SAME

(75) Inventor: Emmanuel Odic, Pontarlier (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/381,250

(22) PCT Filed: Mar. 13, 1998

(86) PCT No.: PCT/FR98/00517

§ 371 Date: Dec. 10, 1999

§ 102(e) Date: Dec. 10, 1999

(87) PCT Pub. No.: WO98/41946

PCT Pub. Date: Sep. 24, 1998

(30) Foreign Application Priority Data

Mar. 17, 1997 (FR) .................................................. 97 03196
Mar. 17, 1997 (FR) .................................................. 97 03197

(51) Int. Cl.[7] .................................................. H01R 24/00
(52) U.S. Cl. .............................. 439/630; 439/60; 439/489
(58) Field of Search .................................. 439/630, 629, 439/60, 489, 862, 260

(56) References Cited

U.S. PATENT DOCUMENTS

| 4,975,086 | * | 12/1990 | Reichardt et al. | 439/629 |
| 5,259,777 | * | 11/1993 | Schuder et al. | 439/630 |
| 5,733,147 | * | 3/1998 | Verstijnen | 439/630 |
| 5,906,516 | * | 5/1999 | Sato et al. | 439/630 |
| 5,975,959 | * | 11/1999 | Joly | 439/660 |

FOREIGN PATENT DOCUMENTS

| 43 30 017 A1 | 3/1995 | (DE) . |
| 2 623 313 | 5/1989 | (FR) . |
| WO 95/33243 | 12/1995 | (WO) . |
| WO 96/02892A1 | 2/1996 | (WO) . |

\* cited by examiner

Primary Examiner—Gary F. Paumen
Assistant Examiner—Tho D. Ta
(74) Attorney, Agent, or Firm—Perman & Green, LLP

(57) ABSTRACT

The invention concerns a card reader connector with microcircuit (1) comprising contacts (2) connected to an electronic circuit and designed, when the card (1) is integrated in the reader, to be connected to the card (1) microcircuit contact pads Said connector comprises a wafer (3) made of electrically insulating material comprising cells (4) each freely receiving a brush contact (2) the first end (5) of which projects from the cell (4) and is designed to be contacted with one contact pad of the card (1) microcircuit and the other end (6, 7) rests on one conducting pad of the electronic circuit formed on a card (10) of the printed circuit pressed against the wafer (3) made of electrically insulating material.

17 Claims, 2 Drawing Sheets

CARD READER CONNECTOR, WITH ELASTIC BRUSH CONTACTS, AND READER COMPRISING SAME

BACKGROUND OF THE INVENTION

The present invention concerns a microcircuit (or microchip) card connector for a card reader, in particular for reading an electronic purse type pocket card.

A pocket card reader of this kind must be of low cost so that it can be marketed on a large scale and must enable the user to verify easily the amount available on their "purse" card.

The problem arises in such readers of connecting the contact areas of the microcircuit carried by the card to the electronic circuit of the reader.

Patents FR 87 15 739 and FR 95 06 854 describe the use for this purpose of connectors comprising brush contacts fastened to an electrically insulative material frame.

DE-A-43 30 017 discloses a microcircuit card reader connector comprising:
  a) contacts connected to an electronic circuit and adapted to be connected to contact areas of the microcircuit of the card when the card is inserted in the reader and,
  b) an electrically insulative material plate comprising cells each freely receiving a brush contact one end of which projects out of the cell and is adapted to come into contact with a contact area of the microcircuit of the card and whose other end bears and slides on a conductive area of the electronic circuit formed on a printed circuit card pressed against the electrically insulative material plate.

WO-A-96 02 892 concerns a microcircuit card reader connector comprising:
  a) contacts connected to an electronic circuit and adapted to be connected to contact areas of the microcircuit of the card when the card is inserted in the reader, and
  b) an electrically insulative material plate incorporating cells each receiving a brush contact one end of which projects out of the cell and is adapted to come into contact with a contact area of the microcircuit of the card and whose other end is in contact with a conductive area of the electronic circuit on a printed circuit card pressed against the electrically insulative material plate.

The end of the brush contact is adapted to be brazed onto a printed circuit card.

WO-A-95 33 243 shows a microcircuit card reader connector comprising:
  a) contacts connected to an electronic circuit and adapted to be connected to contact areas of the microcircuit of the card when the card is inserted in the reader, and
  b) an electrically insulative material plate incorporating cells each freely receiving a brush contact one end of which projects out of the cell and is adapted to come into contact with a contact area of the microcircuit of the card and whose other end is in contact with a conductive area of the electronic circuit on a printed circuit card pressed against the electrically insulative material plate.

The other end of the brush contact is adapted to be pressed elastically against conductive areas of the printed circuit.

The aim of the present invention is to reduce the cost of a connector of the above kind by eliminating all soldering operations for connecting the contact areas of the microcircuit of the card to the contact areas of the electronic circuit of the reader.

SUMMARY OF THE INVENTION

The invention is therefore directed to a connector for a reader for a microcircuit card, comprising contacts connected to an electronic circuit and adapted, when the card is inserted in the reader, to be connected to contact areas of the microcircuit of the card, the connector comprising an electrically insulative material plate incorporating cells each freely receiving a brush contact one end of which projects out of the cell and is adapted to come into contact with a contact area of the microcircuit of the card and whose other end bears and slides on a conductive area of the electronic circuit on a printed circuit card pressed against the electrically insulative material plate.

In accordance with the invention, the connector is characterized in that the brush contacts are in the form of a metal leaf spring bent to a V-shape whose top constitutes said first end and at least one foot of which constitutes said second end.

In this way the brush contacts are simply housed in the cells of an insulative plate, in which they are retained by the printed circuit card that carries the electronic circuit. The brush contacts are freely engaged in these cells and no soldering is necessary.

When the card is inserted in the reader, the contact areas of the microcircuit on the card come into contact with the projecting ends of the brush contacts whose other ends come into contact with the contact areas of the printed circuit card.

The brush contacts are preferably engaged in cells whose section in the plane of the V-shape of the brush contacts has a flared shape substantially complementary to that of the V-shape of the brush contacts.

The brush contacts are preferably made of a metal having spring properties.

Accordingly, when the card is inserted into the reader, it bears on the projecting tops of the V-shaped contacts and presses them down into the cells, which causes elastic deformation of the V-shape of the contacts and sliding of their feet on the contact areas of the printed circuit.

This arrangement makes it possible to establish an excellent electrical connection between the contact areas of the microcircuit of the card and those of the electronic circuit carried by the printed circuit card Other features and advantages of the invention will become more apparent in the course of the following description.

BRIEF DESCRIPTION OF THE DRAWINGS

In the accompanying drawings, which are provided by way of non-limiting example.

DETAILED DESCRIPTION OF THE PRESENT INVENTION

Figure 1:
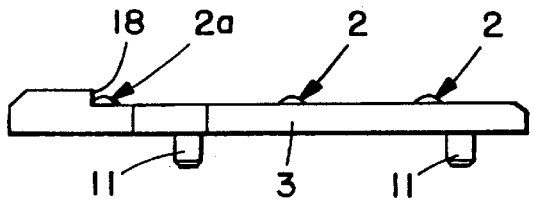
FIG. 1 is a lateral view of the insulative contact-carrier plate of the connector in accordance with the invention.
Figure 2:
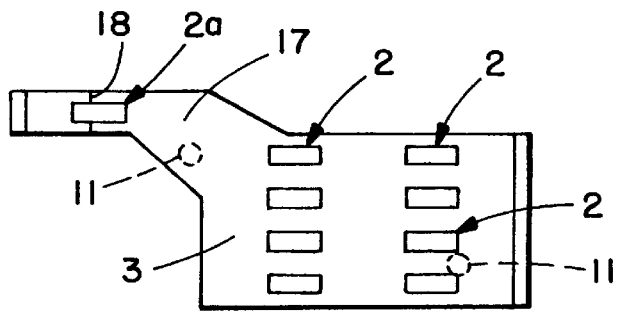
FIG. 2 is a plan view of the plate from FIG. 1.

In the embodiment shown in the accompanying drawings, the connector for a reader of microcircuit cards 1 comprises contacts 2 connected to an electronic circuit 10a and adapted to be connected to contact areas of the microcircuits of the card 1 when the card 1 is inserted in the reader.

In accordance with the invention, the connector comprises (see FIGS. 1, 2, and 5 to 7) an electrically insulative material plate 3 comprising cells 4 each freely receiving one brush contact 12.

Figure 6:
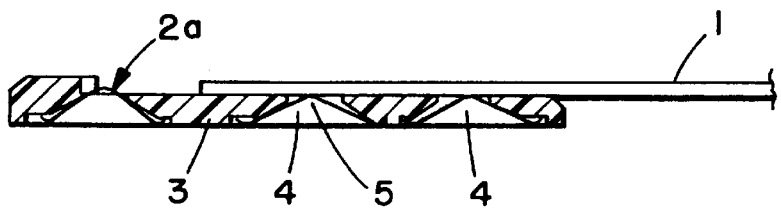
FIG. 6 is a view similar to FIG. 5 with the card partially inserted.
Figure 7:
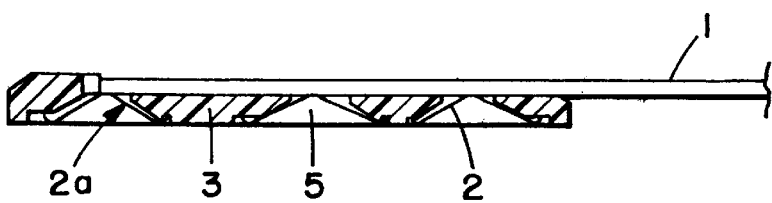
FIG. 7 is a view similar to FIG. 6 with the card fully inserted.

The first end 5 of the brush contacts 2 projects out of the cell 4 and is adapted to come into contact with a contact area of the microcircuit of the card 1 (see FIGS. 6 and 7). The other ends 6, 7 bear on conductive areas 8, 9 of the electronic circuit 3 on a printed circuit card 10 pressed against the electrically insulative material plate 3.

In the example shown, the plate 3 carries tenons 11 cooperating with fixing holes 12 of the printed circuit card 10.

As shown in FIGS. 5 to 9, the brush contacts 2 are in the form of a metal leaf spring bent to a V-shape whose top 5 constitutes the first end, projecting out of the cells 4, and at least one foot 6, 7 of which bears on a conductive area 8, 9 of the electronic circuit 10a.

The brush contacts 2 are engaged in the cells 4, whose section in the plane of the V-shape of the brush contacts 2 has a flared shape substantially complementary to that of the V-shape of the brush contacts 2.

The brush contacts 2 are made from a conductive metal having good spring properties.

Also, the plane of the V-shape of the brush contacts 2 is parallel to the direction in which the card 1 is inserted into the reader.

Figure 8:
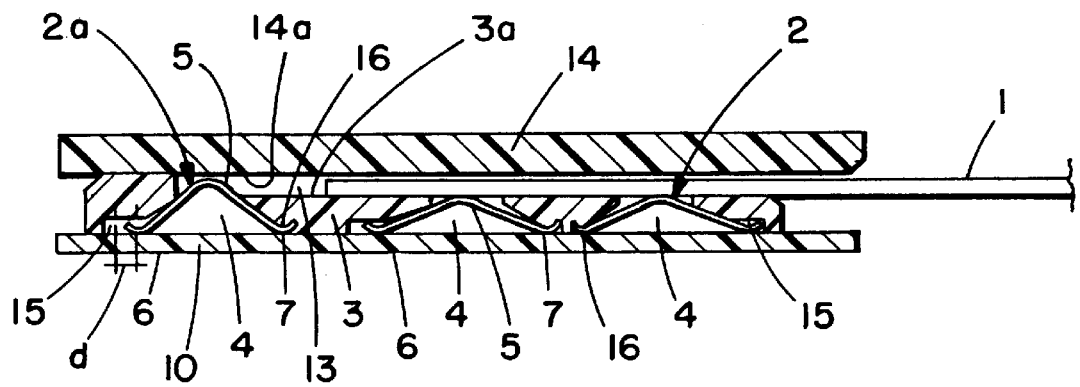
FIG. 8 is a view in longitudinal section of a first embodiment of a connector in accordance with the inventions and FIG. 9 is a view in longitudinal section of a second embodiment of a connector in accordance with the invention.
Figure 9:
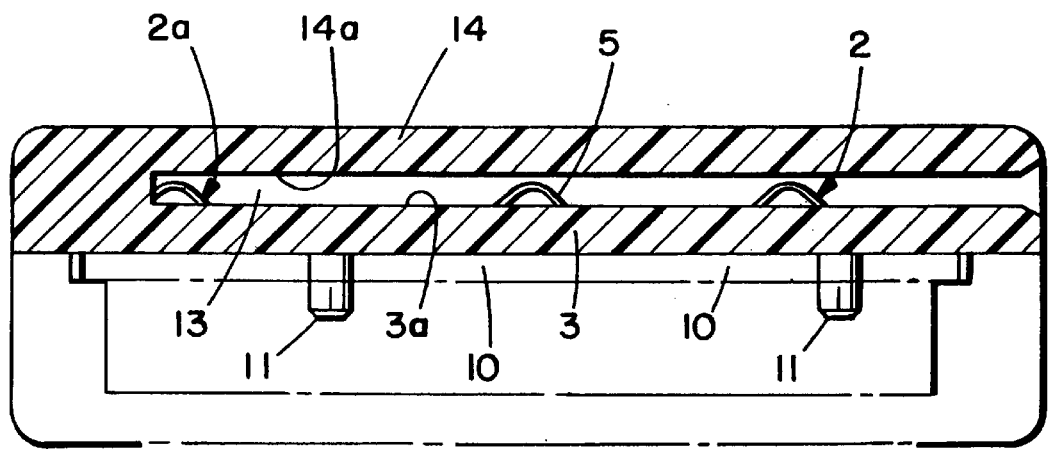

As shown in FIGS. 8 and 9, the first end 5 of the brush contacts 2 projects into a slot 13 delimited by the face 3a of the plate 3 and the face 14a of a card guide 14.

In the FIG. 8 example the card guide 14 is fixed to the plate 3.

In the FIG. 9 example the card guide 14 is made in one piece with the plate 3.

FIG. 8 also shows that the feet of the V-shape of the brush contacts 2 have a shape that is curved toward the plate 3. The feet 6, 7 are engaged in housings 15, 16 of the plate 3 formed between the latter and the printed circuit card 10.

One housing 15 of the housings 15, 16 has a dimension such that the corresponding foot 6 can move a distance d on the contact area 8 or 9 of the printed circuit 10a because of the deformation of the brush contact 2 caused by inserting the card 1.

The other foot 7 of the brush contact 2 is immobilized in the corresponding housing 16 so that it does not move when the card 1 in inserted.

How the connector just described works will now be explained.

Before inserting the card 1 into the reader, the tops 5 of the brush contacts 2 project out of the cells 4 onto the surface 3a of the insulative plate 3.

When the card 1 is inserted, the tops 5 of the contacts 2 are successively pressed down into the cells 4.

This depression causes elastic deformation of the brush contacts 2 as a result of which one of the feet 6 moves a distance d in its housing 15.

This movement of the feet 6 of the contacts 2 brings them into elastic bearing contact with the contact areas 8, 9 and the like of the electronic circuit carried by the printed circuit card 10

When the microcircuit card 1 is fully engaged over the plate 3, as shown in FIG. 7, the contact areas of the microcircuit of the card are in contact with the tops 5 of the brush contacts 2. The brush contacts 2 therefore electrically connect the microcircuit of the card 1 to the electronic circuit carried by the printed circuit card 10.

In the example shown in the figures, the connector of the invention also comprises a contact 2a for detecting the end of the insertion travel of the card into the reader.

The contact 2a is identical to the other contacts and in engaged in a cell 4 in the insulative plate 3 identical to the other cells.

The contact 2a is on a branch 17 of the plate 3 which is offset from its longitudinal axis.

The top 5 of the contact 2a projects from the surface 3a of the plate 3 near a shoulder 18 forming a shoulder at the end of the travel of the card 1.

Figure 3:
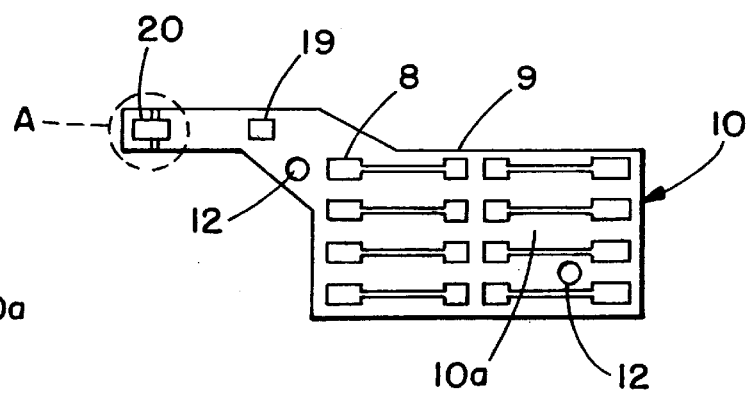
FIG. 3 is a plan view of the printed circuit of the connector in accordance with the invention.

FIG. 7 shows that when the microcircuit card is at its end of travel position on the plate 3, the card 1 bears on the top 5 of the brush contact 2a whose feet 6, 7 bear on two conductive areas 19, 20 of the electronic circuit on the printed circuit card 10 (see FIG. 3) and close a circuit for detecting the end of the travel of the card 1.

One of the conductive areas is duplicated (see FIG. 4) to form a first part 20a which is not connected to the end of travel detector circuit and a second part 20 which is connected to that circuit One foot 7 of the brush contact 2a is immobilized in a housing 16 of the insulative plate 3 (see FIG. 8) and its other foot 6 is engaged in a housing 15 in which it can move a distance d from the first part 20a of the duplicated area toward the second part 20 thereof as a result of the deformation of the brush contact 2a caused by the microcircuit card 1.

Figure 4:
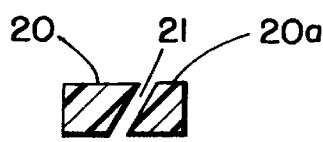
FIG. 4 is an enlarged view of the detail A from FIG. 3.
Figure 5:
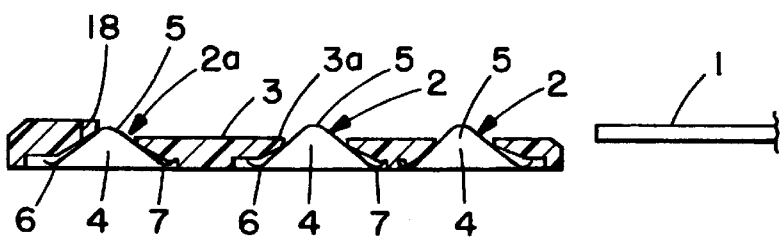
FIG. 5 is a sectional view of the insulative contact-carrier plate and a microcircuit card, before the latter is inserted.

FIG. 4 also shows that the two parts 20, 20a of the duplicated conductive area are separated by a gap 21 that is oblique to the direction in which the second foot 6 of the brush contact 2a moves, which prevents the foot 6 snagging on an increased thickness portion of the second conductive area 20.

Of course, the invention is not limited to the embodiment just described and many modifications can be made to the latter without departing from the scope of the invention.

Accordingly, the invention applies equally to a system in which the card is put down flat rather than slid into place.

Also, the card 1 could be pressed onto the face of the plate 3 from which the contacts 2 project by a spring.

What is claimed is:

1. A connector for a reader for a microcircuit card (1), comprising brush contacts (2) connected to an electronic circuit (10a) on a printed circuit card (10) and adapted, when the card (1) is inserted in the reader, to be connected to contact areas of the microcircuit card, the connector comprising an electrically insulative material plate (3) incorporating cells (4) each receiving one of the brush contacts (2) each brush contact having a first end (5) which projects out of the cell (4) and is adapted to come into contact with one of the contact areas of the microcircuit card (1) and a second end (6, 7) which bears and slides on a conductive area (8, 9) of the electronic circuit on the printed circuit card (10) pressed against the electrically insulative material plate (3), characterized in that each of the brush contacts (2) is in the form of a metal leaf spring bent to a general V-shape having a top (5) which constitutes said first end, and at least one foot (6, 7) which constitutes said second end.

2. A connector according to claim 1, characterized in that the brush contacts (2) are engaged in the cells (4) whose section in the plane of the V-shape of the brush contacts (2) has a flared shape substantially complementary to that of the V-shape of the brush contacts (2).

3. A connector according to claim 1, characterized in that the brush contacts (2) are made of a metal having elastic properties.

4. A connector according to claim 1, characterized in that the plane of the V-shape of each brush contact (2) is generally parallel to the direction in which the microcircuit card (1) is inserted into the reader.

5. A card reader comprising a connector according to claim 1.

6. A connector according to claim 1, characterized in that the first end (5) of each brush contact projects into a slot (13) delimited by one face (3a) of the plate (3) and a face (14a) of a card guide (14).

7. A connector according to claim 6, characterized in that the card guide (14) is fixed to the plate (3).

8. A connector according to claim 6, characterized in that the card guide (14) is made in one piece with the plate (3).

9. A connector according to claim 6, characterized in that the V-shape of each brush contact has another foot (6, 7) so that the V-shape has two feet each foot (6, 7) of the V-shape of each brush contact (2) having a shape curved toward the plate (3).

10. A connector according to claim 9, characterized in that the feet (6, 7) of the V-shape are engaged in corresponding housings (15, 16) formed in the plate (3) between the card guide and the printed circuit card (10).

11. A connector according to claim 10, characterized in that at least one of the housings (15, 16) has a dimension such that a corresponding one of the feet (6) is allowed to move on the conductive area (8, 9) of the printed circuit card upon deformation of the brush contact (2) caused by inserting the card (1).

12. A connector according to claim 11, characterized in that the other foot (7) of the brush contact (2) is immobilized in a corresponding one of the housings (16).

13. A connector according to claim 1, comprising at least one brush contact (2a) for detecting the end of the insertion travel of the card (1) into the reader, the contact (2a) being connected to conductive areas of the electronic circuit, at least one cell (4) freely receiving the at least one brush contact (2a) whose first end (5) projects out of the at least one cell (4) and is adapted to detect the end of the travel of the card (1) and whose other end having two feet (6, 7) bears on an at least one conductive area (19; 20, 20a) of the electronic circuit on the printed circuit card (10).

14. A connector according to claim 13, characterized in that the at least one brush contact (2a) for detecting the end of travel of the microcircuit card (1) is on a branch (17) of the plate (3) which is offset relative to the axis of the plate.

15. A connector according to claim 13, characterized in that the microcircuit card (1) is in an end of travel position relative to plate (3), the card (1) bears on the first end (5) of the at least one brush contact and the feet (6, 7) thereof bear on two conductive areas (19, 20) of the electronic circuit on the printed circuit card (10) to close an end of card travel detector circuit.

16. A connector according to claim 15, characterized in that one of said conductive areas is divided to form a first part (20a) which is not connected to the end of travel detector circuit and a second part (20) which is connected to the end of travel detector circuit, and in that one foot (7) of the at least one brush contact (2a) is immobilized relative to the insulative plate (3) and the second foot (6) is allowed to move from the first part (20a) of the divided area toward the second part (20) thereof due to deformation of the at least one brush contact (2a) caused by the microcircuit card (1).

17. A connector according to claim 16, characterized in that the first and second parts (20, 20a) of the divided conductive area are separated by a gap (21) that is oblique to a direction of movement of said second foot (6) of the at least one brush contact.

* * * * *